(12) United States Patent
Hirose et al.

(10) Patent No.: US 8,375,825 B2
(45) Date of Patent: Feb. 19, 2013

(54) BICYCLE OPERATING DEVICE

(75) Inventors: Kazuyuki Hirose, Sakai (JP); Shinichi Takizawa, Izumisano (JP)

(73) Assignee: Shimano Inc., Osaka (JP)

( * ) Notice: Subject to any disclaimer, the term of this patent is extended or adjusted under 35 U.S.C. 154(b) by 556 days.

(21) Appl. No.: 12/575,548

(22) Filed: Oct. 8, 2009

(65) Prior Publication Data
US 2011/0083525 A1    Apr. 14, 2011

(51) Int. Cl.
B62M 25/04    (2006.01)
(52) U.S. Cl. ............... 74/502.2; 74/489; 74/501.6
(58) Field of Classification Search ........... 74/473.14, 74/489, 501.6, 502.2; 24/21, 20 LS, 24; 403/234–236, 289, 398; B62M 25/04
See application file for complete search history.

(56) References Cited

U.S. PATENT DOCUMENTS

| | | | |
|---|---|---|---|
| 3,886,806 A * | 6/1975 | Nagano | 74/491 |
| 4,974,469 A | 12/1990 | Romano | |
| 5,701,786 A | 12/1997 | Kawakami | |
| 7,849,764 B2 * | 12/2010 | Kua | 74/502.2 |
| 2007/0199401 A1 | 8/2007 | Kawakami et al. | |
| 2010/0139442 A1 * | 6/2010 | Tsumiyama | 74/502.2 |

FOREIGN PATENT DOCUMENTS

| | | |
|---|---|---|
| CN | 2755334 Y | 2/2006 |
| JP | 63-168186 U | 11/1988 |
| JP | 1-157091 U | 10/1989 |

* cited by examiner

*Primary Examiner* — Richard W Ridley
*Assistant Examiner* — Thomas Diaz
(74) *Attorney, Agent, or Firm* — Global IP Counselors, LLP

(57) ABSTRACT

A bicycle operating device is provided with a first operating unit, a second operating unit and a connecting member. The first operating unit includes a clamp portion for attaching the bicycle operating device to a bicycle and a first operating member. The second operating unit includes a housing and a second operating member. The connecting member includes a first portion detachably coupled to an outwardly facing surface of the clamp portion and a second portion coupled to the second operating unit. The first portion includes a retaining part with an outwardly facing surface that faces an inwardly facing surface of the clamp portion when the connecting member is attached to the clamp portion.

13 Claims, 4 Drawing Sheets

BICYCLE OPERATING DEVICE

BACKGROUND OF THE INVENTION

1. Field of the Invention

This invention generally relates to a bicycle operating device. More specifically, the present invention relates to a bicycle operating device that has a connector that connects a first operating unit to a second operating unit in a secure manner.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

Bicycles are typically provided with a pair of brake levers for operating brake devices that apply braking forces to stop rotation of the wheels. These brake levers are typically mounted on the handlebar by a bracket having band clamp, with one being located adjacent each of the grips of the handlebar. A shifter or shift operating device is often mounted adjacent each of the brake levers. The shift operating device is made to shift the gears by operating an operating member in the form of a lever, for example. A conventional shift operating device has a bracket mounted directly on a handlebar, and a main shifter body mounted on the mounting bracket. In conventional practice, in cases in which a shift operating device is provided separately from a brake lever, normally, the shift operating device is attached to the handlebar inside the bracket of the brake lever. However, if the shift operating device is attached to the handlebar inward of the brake lever, then the shifter may be difficult to operate, depending on the shape(s) of the operating member(s) of the shift operating device. To alleviate this problem, the brake lever and the shift operating device are sometimes integrated together as a single unit. Typically, the arrangement brake lever and the shift operating device are fixed relative to each other. For example, an integrated brake/shift operating device is disclosed in U.S. Pat. No. 5,701,786, which is assigned to Shimano Inc. In these integrated brake/shift operating devices, the brake lever and the shift operating device can be permanently fixed together as in U.S. Pat. No. 5,701,786, or they can be attached together in a releasable manner such as disclosed in Japanese Utility Model Registration No. 1-157091U. In this Japanese publication, a shifter unit is attached to the brake band by a bracket and a fastening bolt. One drawback with this design is that if the fastening bolt is broken, then the shifter unit will fall off of the bracket.

SUMMARY OF THE INVENTION

In view of the above mentioned technology, one object of the present invention is to provide a bicycle operating unit connector that connects a first operating unit to a second operating unit in a releasable, but secure manner.

In accordance with one aspect of the present invention, a bicycle operating device is provided that basically comprises a first operating unit, a second operating unit and a connecting member. The first operating unit includes a clamp portion for attaching the bicycle operating device to a bicycle and a first operating member. The second operating unit includes a housing and a second operating member. The connecting member includes a first portion detachably coupled to an outwardly facing surface of the clamp portion and a second portion coupled to the second operating unit. The first portion includes a retaining part with an outwardly facing surface that faces an inwardly facing surface of the clamp portion with the connecting member being attached to the clamp portion.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
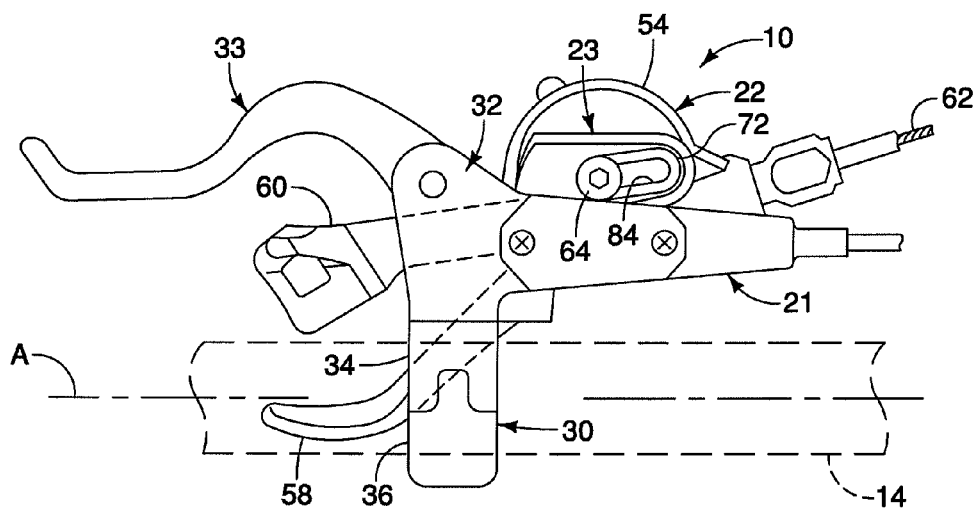
FIG. 1 is a top plan view of a bicycle operating device attached to a handlebar with the bicycle operating device including a brake operating unit and a shift operating unit with the shift operating unit releasably coupled to the brake operating unit by a connecting member in accordance with a first embodiment.

Referring initially to FIG. 1, a bicycle operating device 10 is illustrated in accordance with a first embodiment. The bicycle operating device 10 is configured and arranged to be mounted on an end of a handlebar 14. Basically, the bicycle operating device 10 is provided with a first operating unit 21, a second operating unit 22 and a connecting member 23 that adjustably mounts the second operating unit 22 on the first operating unit 21, as discussed below. In the illustrated embodiment, the first operating unit 21 is a hydraulic brake operating unit, and the second operating unit 22 is a cable operated shift operating unit. Of course, it will be apparent to those skilled in the art from this disclosure that the first operating unit 21 can be a cable operated brake operating unit or any other type of brake operating unit, as needed and/or desired. Likewise, it will be apparent to those skilled in the art from this disclosure that the second operating unit 22 can be any type of shift operating unit, as needed and/or desired. In view of the conventional nature of the first and second operating units 21 and 22, the first and second operating units 21 and 22 will not be discussed and/or illustrated, except to the extent that they are configured to carry other the present invention.

Figure 4:
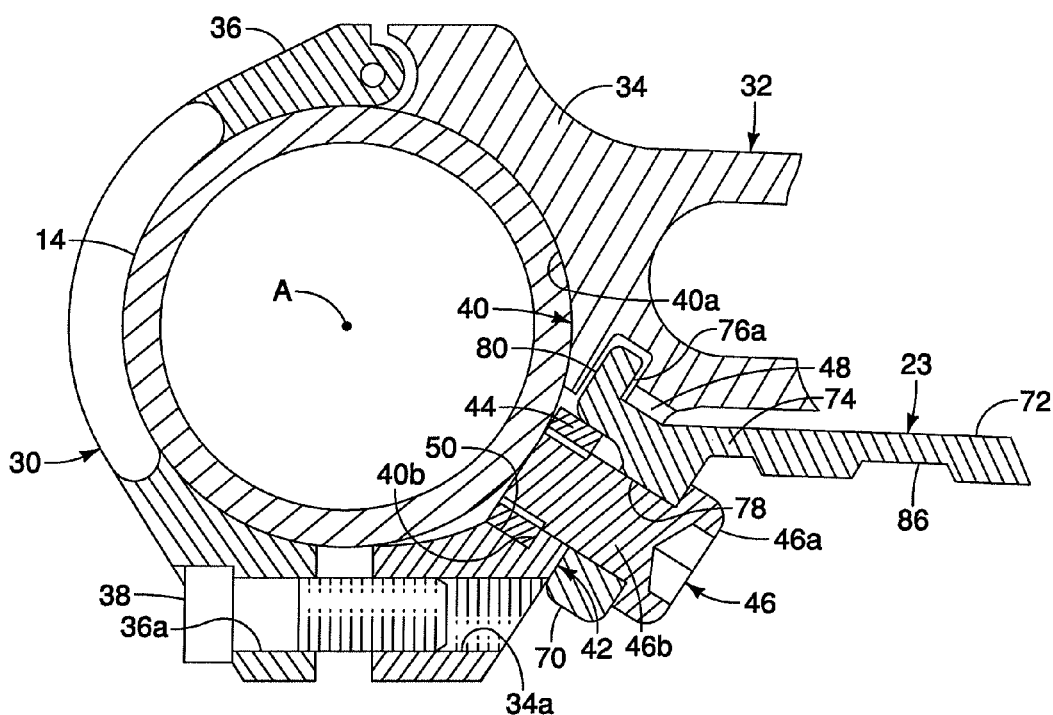
FIG. 4 is a cross sectional view of the bicycle operating device illustrated in FIG. 1, as seen along section line 4-4 of FIG. 3.

Generally, as seen in FIG. 1, the first operating unit 21 includes a clamp portion 30, a bracket portion 32 and a lever or first operating member 33. The lever 33 is pivotally mounted to the bracket portion 32. Operation of the lever 33 causes an increase in fluid pressure to operate a brake device (not shown) in a conventional manner. As seen in FIG. 4, the clamp portion 30 has a first band part 34 and a second band part 36. The first and second band parts 34 and 36 are pivotally connected at first ends, with second ends of the first and second band parts 34 and 36 being releasably attached together by a threaded fastener or bolt 38. Tightening the bolt 38 causes the clamp portion 30 to squeezes the handlebar 14 for attaching the bicycle operating device 10 to a bicycle (only the handlebar 14 of the bicycle is illustrated).

In the illustrated embodiment, the first band part 34 is integrally formed with the bracket portion 32. As seen in FIG. 4, the first band part 34 has a threaded hole 34a for threadedly receiving the bolt 38. The second band part 36 has a non-threaded hole 36a for receiving the bolt 38 therethrough. By tightening the bolt 38, the first and second band parts 34 and 36 move towards each other to squeeze the handlebar 14. Thus, the first and second band parts 34 and 36 fixedly secure the first and second operating units 21 and 22 to the handlebar 14. Once the clamp portion 30 is non-movably secured to the handlebar 14, a center axis A of the handlebar 14 becomes coincident with a center axis of the clamp portion 30. Thus, the center axis A as shown in the drawings refers to both the center axis of the handlebar 14 and the center axis of the clamp portion 30.

Figure 5:
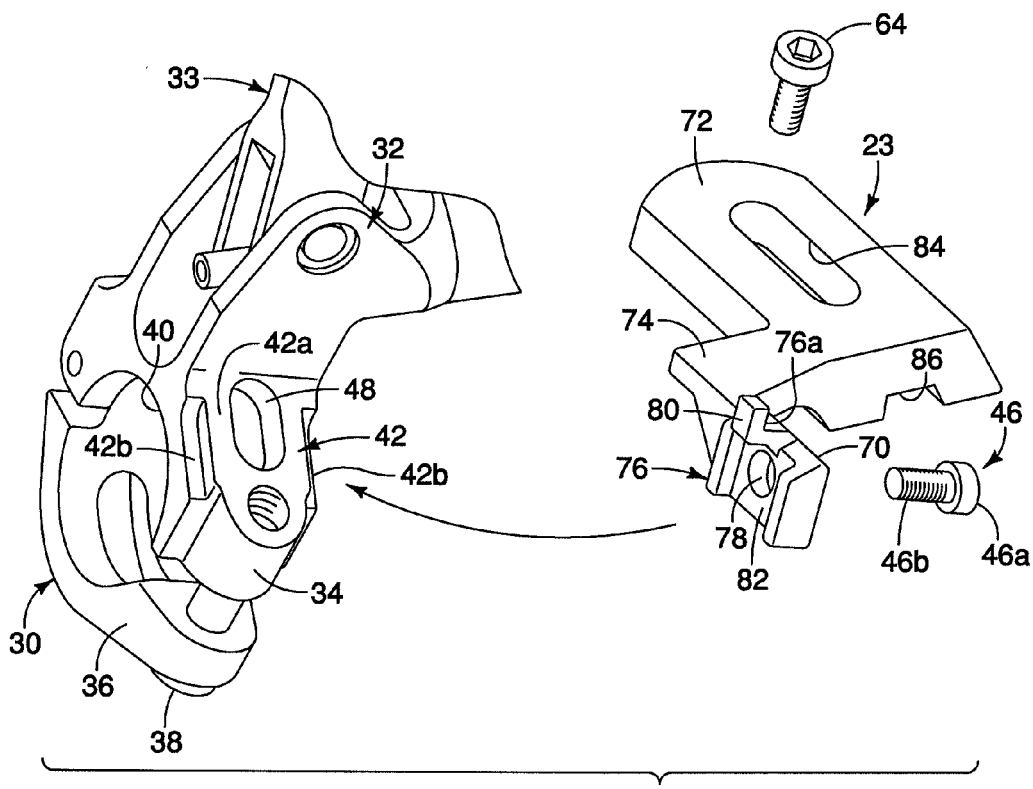
FIG. 5 is an exploded perspective view of a portion of the shift operating unit and the connecting member.
Figure 6:
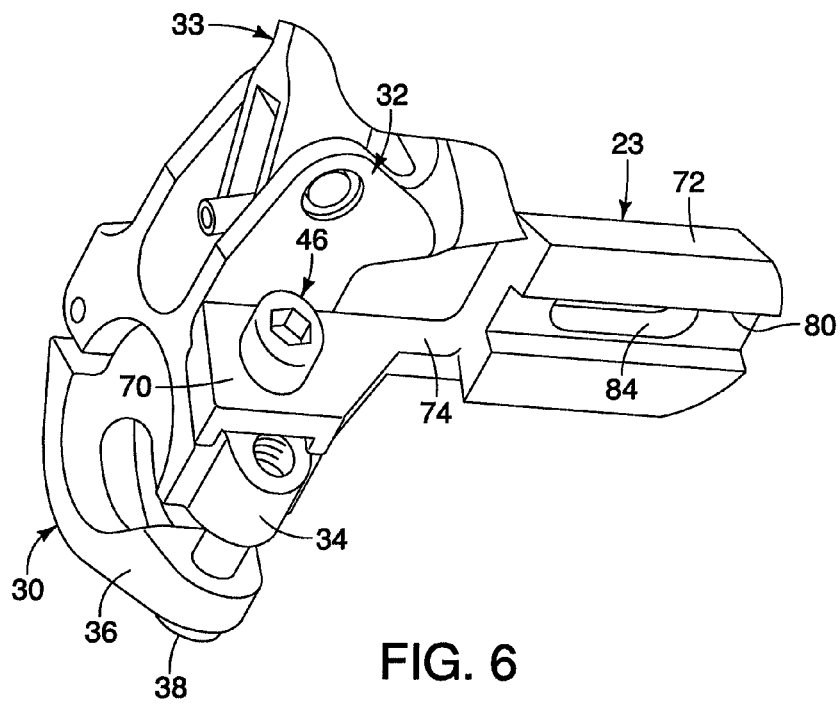
FIG. 6 is a perspective view of the connecting member installed on the brake operating unit.

As best seen in FIGS. 4 and 5, the first band part 34 of the clamp portion 30 has an inwardly facing surface 40 with respect to the center axis A and an outwardly facing surface 42 with respect to the center axis A. An inwardly facing surface portion 40a of the inwardly facing surface 40 of the first band part 34 contacts the handlebar 14. The connecting member 23 is fastened to the outwardly facing surface 42 of the first band part 34 by a nut 44 and a fastener or bolt 46. The fastener or bolt 46 includes a head 46a and a threaded shaft 46b. The head 46a is rigidly fixed to a first end of a shaft 46b and the nut 44 threaded on a second end of the shaft 46 to secure the connecting member 23 to the first band part 34. In particular, a slot or elongated opening 48 is formed in the first band part 34 of the clamp portion 30 for receiving the bolt 46. The elongated opening 48 extends through from the inwardly facing surface 40 to the outwardly facing surface 42. The maximum width of the opening 48 is smaller than the maximum width of a head 46a of the bolt 46, while the maximum width of a shaft 46b of the bolt 46 is equally to or smaller than the maximum width of the elongated opening 48 so that the shaft 46b of the bolt 46 can pass through the elongated opening 48.

Preferably, the inwardly facing surface 40 has a recess 50 that receives the nut 44 and a portion of the connecting member 23 as discussed. The recess 50 includes an inwardly facing surface portion 40b of the inwardly facing surface 40 that restricts movement of the connecting member 23. In other words, the nut 44 is disposed in a space formed by the recess 50 that is located between the inwardly facing surface portion 40b of the inwardly facing surface 40 of the clamp portion 30 and the handlebar 14 (e.g., a portion of a bicycle) of the bicycle when the bicycle operating device 10 is clamped to the handlebar 14. The recess 50 is dimension and shaped to prevent the nut 44 from rotating within the recess 50 when the connecting member 23 is attached to the first band part 34 of the clamp portion 30 by the bolt 46. The recess 50 is dimension and shaped such that the nut 44 is either slightly spaced from or lightly contacts the outer surface of the handlebar 14, when the clamp portion 30 is tightly secured (i.e., rigidly fixed) to the handlebar 14. In this manner, the nut 44 will not damage the handlebar 14 when the clamp portion 30 is tightly secured (i.e., rigidly fixed) to the handlebar 14.

Preferably, as seen in FIG. 5, the outwardly facing surface 42 of the first band part 34 of the clamp portion 30 has a flat surface portion 42a and a pair of recesses 42b that form a pair of side contact surfaces on opposite edges of the flat surface portion 42a. The flat surface portion 42a and the recesses 42b cooperate with the connecting member 23 to prevent rotation of the connecting member 23 about the bolt 46.

Figure 2:
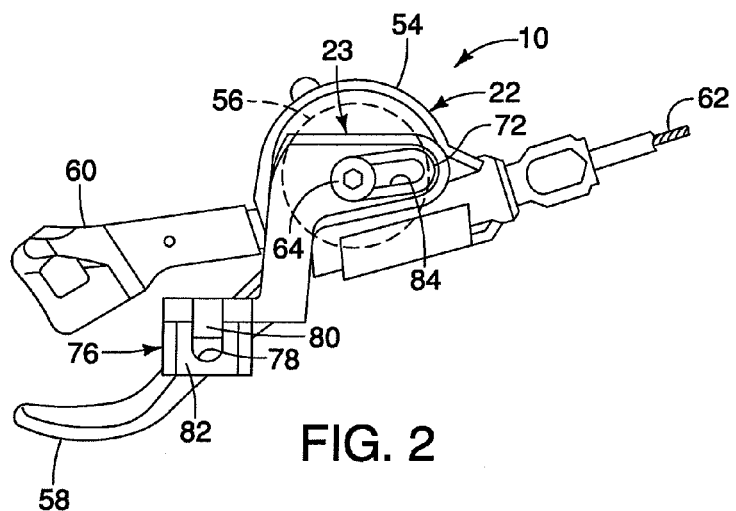
FIG. 2 is a top plan view of the shift operating unit illustrated in FIG. 1, with the connecting member adjustably secured thereto.
Figure 3:
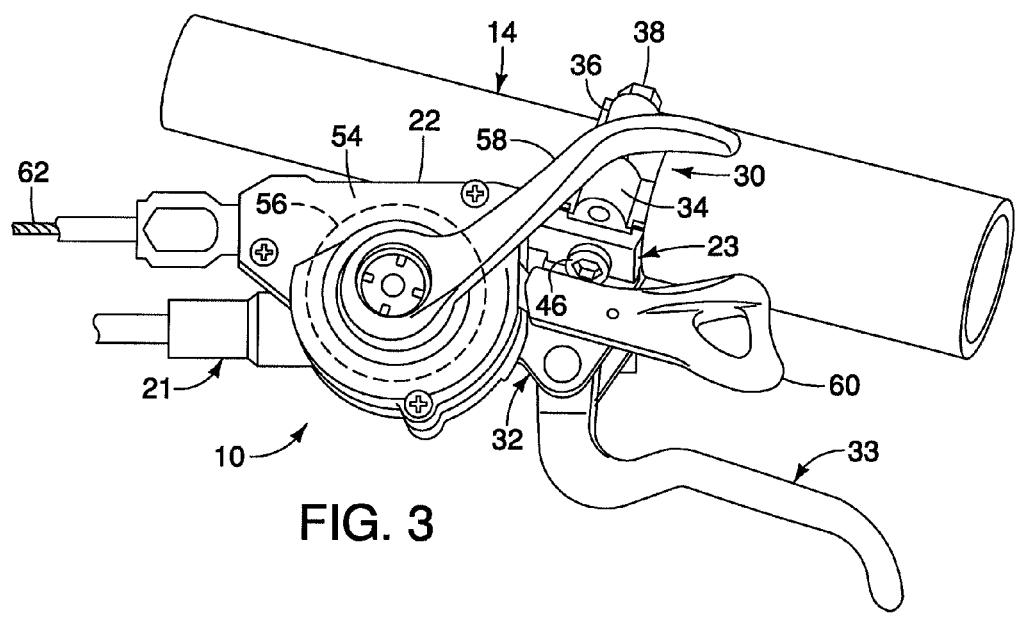
FIG. 3 is a bottom side perspective view of the bicycle operating device illustrated in FIG. 1.

Turning back to FIGS. 1 to 3, the second operating unit 22 will now be briefly discussed. The second operating unit 22 includes a housing 54, a cable winding unit 56 disposed inside the housing 54 and a pair of operating members 58 and 60 extending out of the housing 54. The operating members 58 and 60 are used to operate the cable winding unit 56 to pull and release an inner wire 62 that is attached to a wire takeup member of the cable winding unit 56. Shifters are well known in the bicycle field, and it will be apparent from this disclosure that the second operating unit 22 can be any type of shifter unit (e.g., a one lever shifter, a two lever shifter, etc.). In other words, the cable winding unit 56 can be any type of shifting unit. Thus, the cable winding unit 56 will not be described and/or illustrated in detail herein. The housing 54 has an upper surface with a protruding rib that acts as a positioning member or an anti-rotation member. In particular, the connecting member 23 is attached to the housing 54 by a threaded fastener or screw 64 that engages a threaded hole of the second operating unit 22. The protruding rib engages the connecting member 23 to prevent relative rotation of the second operating unit 22 with respect to the connecting member 23 about the axis of the screw 64.

Referring now to FIGS. 2 and 4 to 6, the connecting member 23 will now be discussed in more detail. Basically, the connecting member 23 is an attachment member (adapter) for attaching the second operating (shift lever) unit 22 to the first operating (brake lever) unit 21. This connecting member 23 can provide an adjustment function of the second operating (shift lever) unit 22 with respect to the first operating (brake lever) unit 21 in direction generally parallel with the axis A of the handlebar 14.

In this illustrated embodiment, the connecting member 23 is preferably a one-piece, unitary member that is constructed of a hard rigid material such a rigid metal or a rigid plastic material. The connecting member 23 basically includes a first attachment portion 70, a second attachment portion 72 and an intermediate portion 74 interconnecting the first and second attachment portions 70 and 72.

The first attachment portion 70 of the connecting member 23 is detachably coupled to the outwardly facing surface 42 of the first band part 34 of the clamp portion 30 by the bolt 46. The second attachment portion 72 is adjustably and detachably attached to the second operating unit 22 by the screw 64.

The first attachment portion 70 includes a retaining part 76 and a fastener (first) opening 78. The retaining part 76 has an outwardly facing surface 76a that faces the inwardly facing surface portion 40b of the inwardly facing surface 40 of the clamp portion 30 when the connecting member 23 is attached to the clamp portion 30. In particular, the retaining part 76 includes a hook 80 that is disposed in a space formed by the recess 50 that is located between the inwardly facing surface portion 40b of the inwardly facing surface 40 of the clamp portion 30 and the outer surface of the handlebar 14 (e.g., a portion of a bicycle) when the bicycle operating device 10 is clamped to the handlebar 14 (e.g., the portion of the bicycle). Thus, the bicycle operating device 10 is clamped to the handlebar 14, the hook 80 of retaining part 76 extends through the (second) opening 48 of the clamp portion 30, with the outwardly facing surface 76a facing the inwardly facing surface portion 40b of the inwardly facing surface 40 of the clamp portion 30. Preferably, the retaining part 76 further includes a recessed area 82 surrounding the (first) opening 78 that forms a pair of opposed abutment surfaces that contact a pair of mating contact surfaces formed by the recesses 42b to prevent relative rotation of the retaining part 76 about a center longitudinal axis of the (first) opening 78.

By using the connecting member 23 with the retaining part 76, the second operating (shift lever) unit 22 remains attached to the first operating (brake lever) unit 21 even if the bolt 46 is broken or drops off from the nut 44. In particular, the hook 80 of the retaining part 76 extends through the elongated opening 48 and is disposed in the recess 50. With the clamp portion 30 tightened on the handlebar, even if the bolt 46 is broken, the connecting member 23 does not drop from the clamp portion 30, since movement the hook 80 of the retaining part 76 of the connecting member 23 is restricted by the nut 44 whose movement in turn is also restricted by the handlebar 14 and the clamp portion 30. Thus, accidental drop of the second operating (shift lever) unit 22 is prevented.

The second attachment portion 72 extends transversely from the first attachment portion 70 via the intermediate portion 74. The second attachment portion 72 is configured to be detachably attached to the second operating unit 22 by the fastener or screw 64. The second attachment portion 72 of the connecting member 23 includes an opening 84, with the fastener 64 having a shaft disposed in the opening 84 and attached to the housing 54 of the second operating unit 22. The lower surface of the second attachment portion 72 has a recess 86 that receives a protruding rib of the housing 54 of the second operating unit 22 to prevent relative rotation therebetween.

Figure 7:
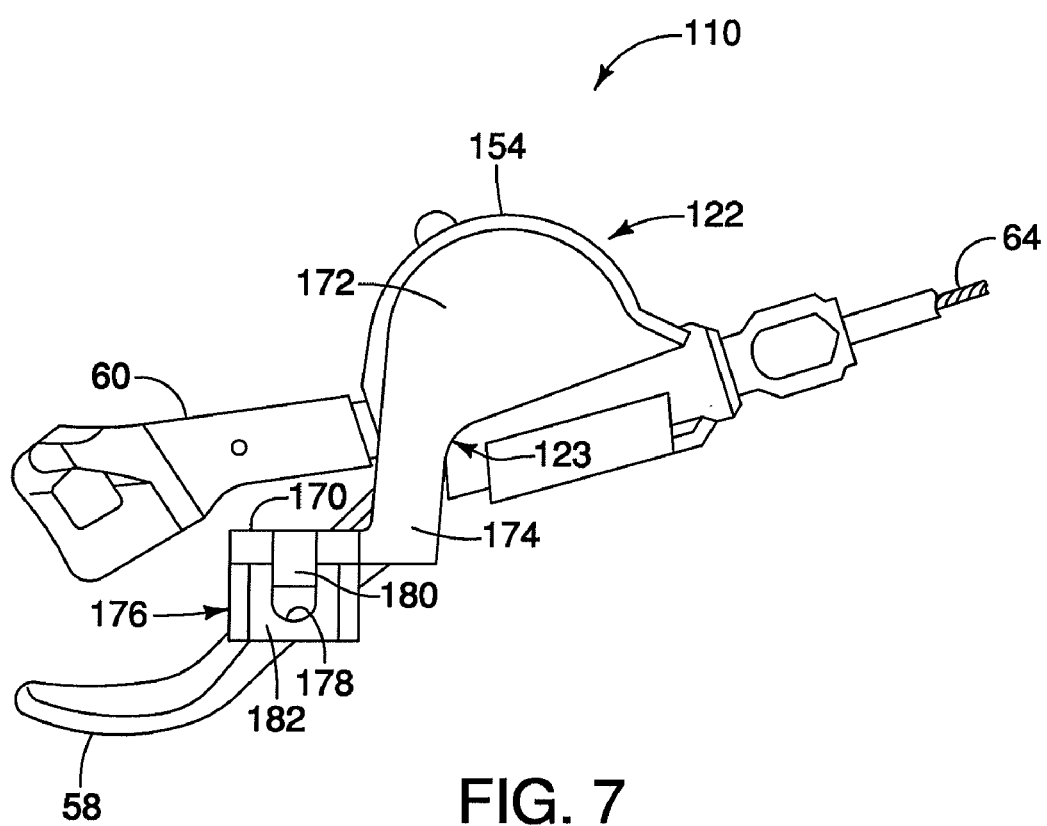
FIG. 7 is a top plan view of a shift operating unit with connecting member integrally formed with a part of a housing of the shift operating unit as a one-piece, unitary member.

Referring now to FIG. 7, a bicycle operating device 110 in accordance with a second embodiment will now be explained. A modified second operating unit 122 is provided with an integrally formed connecting member 123. The connecting member 123 basically includes a first attachment portion 170, a second attachment portion 172 and an intermediate portion 174 interconnecting the first and second attachment portions 170 and 172. The first attachment portion 170 is identical to the first attachment portion 70 of the connecting member 23, and includes a retaining part 176 with an opening 178. The retaining part 176 further includes a hook 180 and a recessed area 182 surrounding the opening 178.

The only difference between the bicycle operating device 10 and the bicycle operating device 110 is that the second operating unit 122 of the bicycle operating device 110 has the connecting member 123 integrally formed with a housing 154 of the second operating unit 122. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts, unless otherwise specified. As used herein to describe the above embodiment(s), the following directional terms "forward", "rearward", "above", "downward", "vertical", "horizontal", "below", "transverse" "inwardly facing surface" and "outwardly facing surface" as well as any other similar directional terms refer to those directions with respect to the handlebar or bicycle part in which the bicycle operating device is attached thereto. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A bicycle operating device comprising:
   a first operating unit including a clamp portion for attaching the bicycle operating device to a bicycle, and a first operating member, the clamp portion having an opening and a recess located inward of the opening;
   a second operating unit including a housing and a second operating member; and
   a connecting member including a first attachment portion detachably coupled to an outwardly facing surface of the clamp portion and a second attachment portion coupled to the second operating unit, the first attachment portion including a retaining part disposed in the recess of the clamp portion with an outwardly facing surface of the retaining part facing an inwardly facing surface of the clamp portion while the connecting member is attached to the clamp portion, the retaining part being dimensioned relative to the opening of the clamp portion and the recess of the clamp portion such that at least the outwardly facing surface of the retaining part is selectively inserted into the recess and selectively removed from the recess through the opening of the clamp portion, the retaining part being an integral non-movable part of the first attachment portion.

2. The bicycle operating device according to claim 1, wherein
the first attachment portion of the connecting member includes an opening, with a fastener including a shaft disposed in the openings of the first attachment portion and the clamp portion to secure the first attachment portion of the connecting member to the clamp portion.

3. The bicycle operating device according to claim 2, wherein
the fastener further includes a head rigidly fixed to a first end of the shaft and a nut threaded on a second end of the shaft.

4. The bicycle operating device according to claim 3, wherein
the nut is disposed in a space formed by the recess of the clamp portion which is formed by the inwardly facing surface of the clamp portion.

5. The bicycle operating device according to claim 2, wherein
the retaining part further includes a recessed area surrounding the opening of the first attachment portion that forms a pair of opposed abutment surfaces that contact a pair of mating contact surfaces to prevent relative rotation of the retaining part about a center longitudinal axis of the opening of the first attachment portion.

6. The bicycle operating device according to claim 1, wherein
the retaining part includes a hook that is disposed in a space formed by the recess of the clamp portion, the hook being located between the inwardly facing surface of the clamp portion and the outwardly facing surface of the clamp portion.

7. The bicycle operating device according to claim 6, wherein
the hook extends through the opening of the clamp portion.

8. The bicycle operating device according to claim 6, wherein
the retaining part further includes a recessed area surrounding an opening of the first attachment portion of the connecting member, the recessed area forming a pair of opposed abutment surfaces that contact a pair of mating contact surfaces to prevent relative rotation of the retaining part about a center longitudinal axis of the opening of the first attachment portion.

9. The bicycle operating device according to claim 1, wherein
the first operating unit is a brake operating unit, and the second operating unit is a shift operating unit.

10. The bicycle operating device according to claim 1, wherein
the outwardly facing surface of the clamp portion is formed on a band part of the clamp portion of the first operating unit.

11. The bicycle operating device according to claim 1, wherein
the second attachment portion of the connecting member includes an opening, with a fastener having a shaft disposed in the opening of the second attachment portion and attached to the housing of the second operating unit.

12. The bicycle operating device according to claim 1, wherein
the second attachment portion of the connecting member is integrally formed with a part of the housing of the second operating unit.

13. A bicycle operating device comprising:
a first operating unit including a clamp portion for attaching the bicycle operating device to a bicycle, and a first operating member, the clamp portion including an opening and a recess that is located on a handlebar-facing side of the opening;
a second operating unit including a housing and a second operating member;
a connecting member including a first attachment portion including an opening and being detachably coupled to an outwardly facing surface of the clamp portion and a second attachment portion coupled to the second operating unit, the first attachment portion further including a retaining part with an outwardly facing surface that faces an inwardly facing surface of the clamp portion with the connecting member being attached to the clamp portion; and
a fastener including a shaft and a nut threaded on an end of the shaft, the shaft being disposed in the openings of the first attachment portion and the clamp portion, the fastener securing the first attachment portion of the connecting member to the clamp portion, the nut being disposed in the recess of the clamp portion, and the retaining part extending through the opening of the clamp portion and into the recess of the clamp portion.

* * * * *